United States Patent [19]
Matsumoto

[11] Patent Number: 5,715,227
[45] Date of Patent: Feb. 3, 1998

[54] OPTICAL PICKUP DEVICE

[75] Inventor: Yoshiyuki Matsumoto, Tokyo, Japan

[73] Assignee: Sony Corporation, Tokyo, Japan

[21] Appl. No.: 738,540

[22] Filed: Oct. 28, 1996

[30] Foreign Application Priority Data

Nov. 1, 1995 [JP] Japan ................. 7-308220

[51] Int. Cl.$^6$ ........................ G11B 7/13
[52] U.S. Cl. ............... 369/112; 369/44.23; 369/44.37; 369/122
[58] Field of Search ................. 369/112, 122, 369/44.23, 44.37, 120, 121

[56] References Cited

U.S. PATENT DOCUMENTS

| | | | |
|---|---|---|---|
| 5,327,415 | 7/1994 | Vettiger et al. | 369/122 |
| 5,446,719 | 8/1995 | Yoshida et al. | 369/122 |
| 5,568,463 | 10/1996 | Sahara et al. | 369/122 |
| 5,608,716 | 3/1997 | Koyama et al. | 369/122 |

FOREIGN PATENT DOCUMENTS 7-114764  5/1995  Japan ................. G11B 7/135

*Primary Examiner*—David C. Nelms
*Assistant Examiner*—Kim-Kwok Chu
*Attorney, Agent, or Firm*—Limbach & Limbach L.L.P.

[57] ABSTRACT

An optical pickup device for irradiating a laser beam onto an optical recording medium and receiving a return light from the optical recording medium, comprising a semiconductor laser element which is formed on a semiconductor substrate and has first and second light emitting faces, a first reflection portion provided so as to confront the first light emitting face of the semiconductor laser element, a second reflection portion provided so as to provide confront the second light emitting face of the semiconductor laser element, a first photodetector for receiving a return reflection light of the laser beam which is reflected from the first reflection portion and focused on the recording medium, and a second photodetector for receiving a return reflection light of the laser beam which is reflected from the second reflection portion and focused on the recording medium. A recording signal on the recording medium and a focus error signal are detected by the first and second photodetectors.

19 Claims, 9 Drawing Sheets

FIG. 12
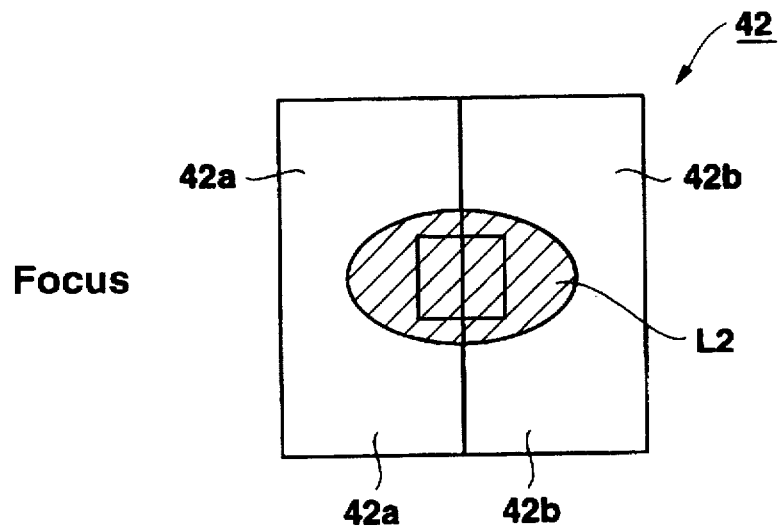
Focus
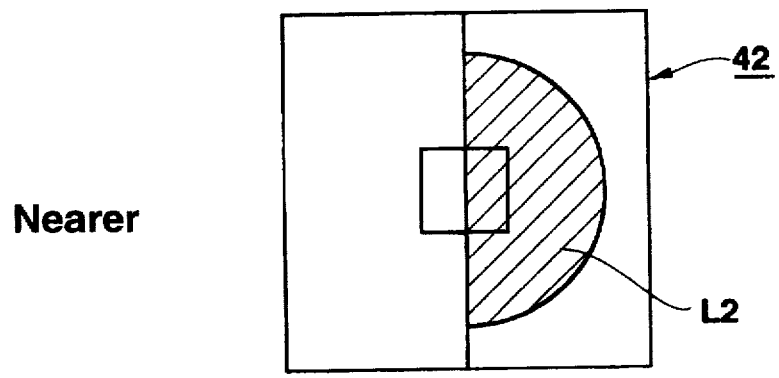
Nearer
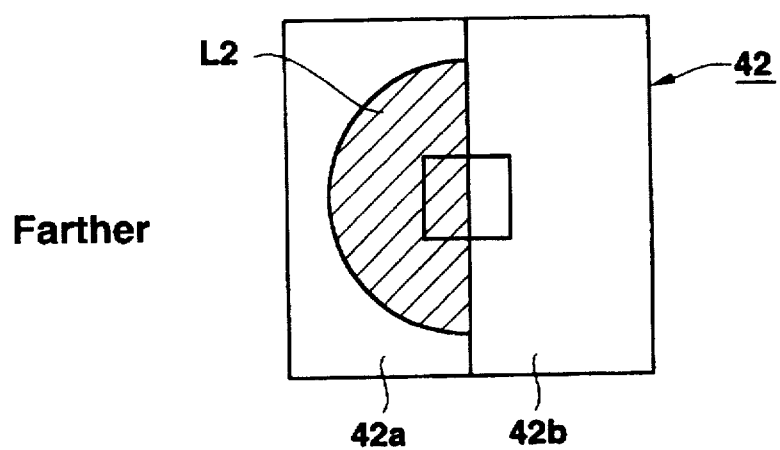
Farther

OPTICAL PICKUP DEVICE

BACKGROUND OF THE INVENTION

1. Field of the Invention

The present invention relates to an optical device, and more particularly to an optical pickup device used to record and/or reproduce information on/from an optical medium such as a compact disc or the like.

2. Description of Related Art

As disclosed in Japanese Laid-open Patent Publication No. Hei-7-114746, an optical pickup for reproducing an optical disc is equipped with a light emitting and detecting element 2 and an objective lens 3 as shown in FIG. 1.

The light emitting and receiving element 2 comprises a light emitting element and a photodetector, and these elements are integrally formed on a semiconductor substrate $2a$ as shown in FIG. 1.

The light emitting element of the light emitting and receiving element 2 includes a semiconductor laser element $2b$ formed on the semiconductor substrate $2a$, and a reflection mirror $2c$ which is formed obliquely from the surface of the semiconductor substrate $2a$. The photodetector includes a photodetector $2d$ comprising a photodiode formed in the neighborhood of the co-focusing point on the semiconductor substrate $2a$.

The semiconductor laser element $2b$ is a light emitting element using a recombination radiation phenomenon of the semiconductor. In the case of FIG. 1, it comprises a resonator which relates in a horizontal direction, and it is used as a light emitting source. A light beam emitted from the front surface of the semiconductor laser element $2b$ in the horizontal direction is guided to the reflection mirror $2c$.

The reflection mirror $2c$ is formed of a reflection film comprising a metal film, a dielectric multilayer film or the like on a slant surface formed on the semiconductor substrate $2a$ so as to have an slope angle of 45 degrees. The reflection mirror $2c$ reflects upwardly the light beam emitted from the semiconductor laser element $2b$ in FIG. 1. The laser beam which is upwardly reflected is passed through the objective lens 3 and focused onto the signal recording surface of the optical disc 4, thereafter returning therefrom as a return light. The return light is passed through the objective lens 3 again and incident to the photodetector $2d$ of the light emitting and receiving element 2.

The objective lens 3 is a concave lens, and serves to focus the light beam emitted from the light emitting and receiving element 2 on a desired track of the signal recording surface of the optical disc 4 which is rotationally driven by a driving means (not shown).

The photodetector $2d$ is divided into four parts in the right and left direction (as indicated by arrows L and R) and in the vertical direction to have four sensor portions.

The detection signal of each sensor portion of the photodetector $2d$ is amplified by a head amplifier in a processing circuit (not shown), and then subjected to predetermined calculations to obtain a reproduction signal and a tracking error signal by a calculation circuit.

According to the optical pickup 1 thus constructed, the light beam emitted from the semiconductor laser element $2b$ is reflected from the reflection mirror $2c$ on the semiconductor substrate $2a$, and then passed through the objective lens 3 to be focused on the signal recording surface of the optical disc 4.

The return light reflected from the signal recording surface of the optical disc 4 is passed through the objective lens 3 again and incident to the photodetector $2d$ of the light emitting and receiving element 2. The reproduction signal and the tracking error signal are calculated on the basis of the output signal from each sensor portion of the photodetector $2d$ of the light emitting and receiving element 2.

In the above case, in FIGS. 2 and 3, the diameter $\phi s$ of the emitted light beam of the semiconductor laser element $2b$ is set to several micrometers, for example, and the return light is converged at a level of diffraction limit $\phi d$ (for example, about 10 µm). The return light Lr is incident to the photodetector $2d$, and thus the light detecting efficiency is high.

However, in the optical pickup 1 thus constructed, in order to obtain an focus error signal, an external optical part such as a cylindrical lens or the like must be provided in an optical path of the return light to generate astigmatism. Therefore, the number of parts increases, and thus a part cost and a fabrication cost rise up. In addition, when the focus error signal is obtained by using these external optical parts, the spot of the formed on the photodetector of the light emitting and receiving element would be shifted from its initial state if the external parts are positionally displaced from their predetermined positions due to environmental variation or the like, resulting in reduction of the precision of a focus servo. As a result, the reliability of a monolithic integrated type light emitting and receiving element 2 which aims at high precision performance is lost.

SUMMARY OF THE INVENTION

An object of the present invention is to provide a compact integrated type light emitting and receiving element which can also detect a focus error signal, and an optical pickup and an optical disc apparatus which use the integrated type light emitting and receiving element.

This object is accomplished by a optical pickup device comprising:

an objective lens for focusing a light beam onto a recording medium; a semiconductor laser element which is formed on a semiconductor substrate and adapted to emit a laser beam, the semiconductor laser element having first and second light emitting faces; a first reflection portion provided so as to confront the first light emitting face of the semiconductor laser element, the first reflection portion reflecting the laser beam emitted from the first light emitting face of the semiconductor laser element toward the objective lens; a second reflection portion provided so as to provide confront the second light emitting face of the semiconductor laser element, the second reflection portion reflecting the laser beam emitted from the second light emitting face of the semiconductor laser element toward the objective lens; a first photodetector for receiving a return reflection light of the laser beam which is reflected from the first reflection portion, passed through the objective lens and focused on the recording medium; and a second photodetector for receiving a return reflection light of the laser beam which is reflected from the second reflection portion, passed through the objective lens and focused on the recording medium.

Further, a light emitting and receiving element according to the present invention is an element for emitting a laser beam and receiving a laser beam reflected from an irradiation target comprising: a semiconductor laser element formed on a semiconductor substrate for emitting a laser beam, the semiconductor laser element having first and second light emitting faces; a first reflection portion provided so as to confront the first light emitting face of the semiconductor laser element, the first reflection portion reflecting the laser beam emitted from the first light emitting face of the semiconductor laser element to an irradiation target; a second reflection portion provided so as to confront the second light emitting face of the semiconductor laser element, the second reflection portion reflecting the laser beam emitted from the second light emitting face of the semiconductor laser element to the irradiation target; a first photodetector for receiving a return reflection light of the laser beam which is reflected from the first reflection portion and projected to the irradiation target; and a second photodetector for receiving a return reflection light of the laser beam which is reflected from the second reflection portion and projected to the irradiation target.

BRIEF DESCRIPTION OF THE DRAWINGS

FIG. 12 is an enlarged plan view showing spot formation of the second photodetector of the optical pickup of FIG. 10.

DETAILED DESCRIPTION OF THE PREFERRED EMBODIMENTS

Preferred embodiments according to the present invention will be described hereunder with reference to FIGS. 4 to 12.

The following embodiments are suitably used as preferred embodiments of the present invention, and thus various preferred limitations are added to these embodiments. However, the present invention is not limited to these embodiments unless the description on the limitation is specifically made.

Figure 4:
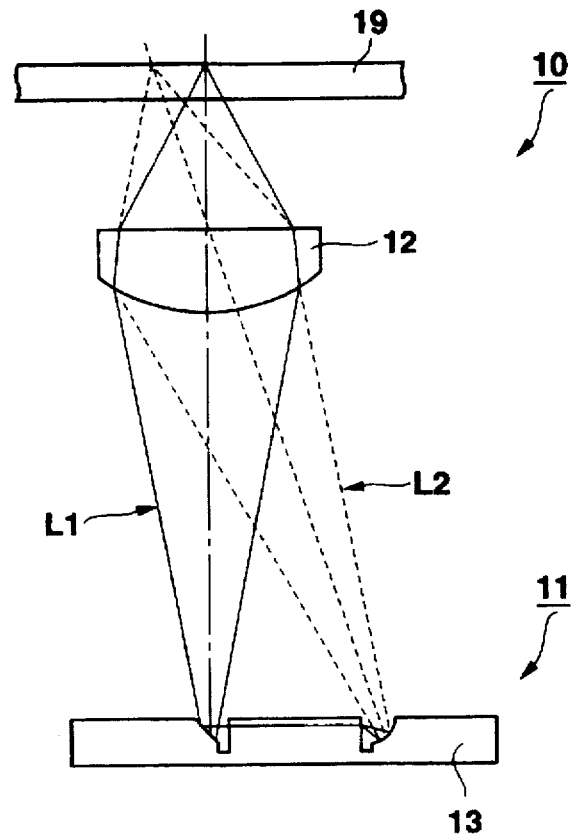
FIG. 4 is a schematic diagram showing the whole construction of an embodiment of an optical pickup according to the present invention.
Figure 5:
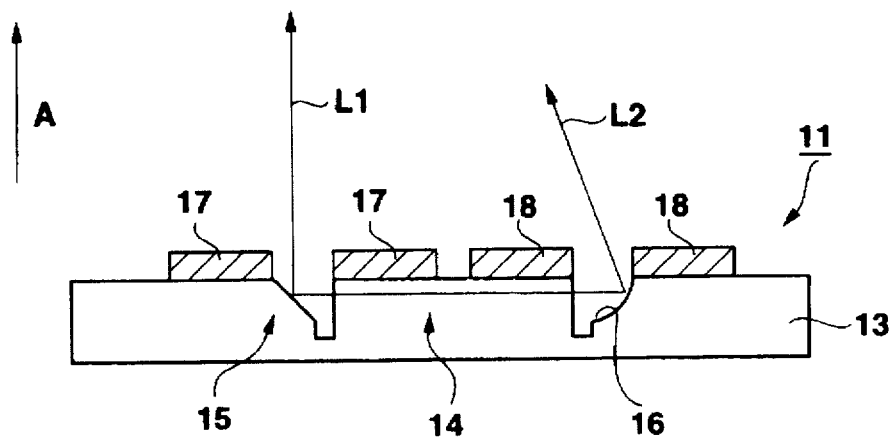
FIG. 5 is an enlarged cross-sectional view showing a light emitting and receiving element of the optical pickup shown in FIG. 4.

FIGS. 4 and 5 show an embodiment of an optical pickup according to the present invention which is applied to an optical disc player. In this embodiment, the optical pickup 10 is of such an optical pickup type as having the same going and returning optical path (i.e., the going and returning optical paths are located in the optical axis). In FIG. 4, the optical pickup 10 contains a light emitting and receiving element 11 and an objective lens 12.

The light emitting and receiving element 11 is integrally formed on a semiconductor substrate 13 as shown in FIG. 5 in detail. That is, the light emitting and receiving element 11 comprises a light emitting unit and a photodetector. The light emitting units a semiconductor laser element 14 formed on the semiconductor substrate 13, a first reflection mirror 15 serving as a first reflector formed on the surface of the semiconductor substrate 13 at the front side of the semiconductor laser element 14, and a second reflection mirror 16 serving as a second reflector formed on the surface of the semiconductor substrate 13 at the rear surface side of the semiconductor laser element 14. Furthermore, the photodetector includes a first photodetector 17 and a second photodetector 18 which comprise diodes formed around the reflection mirrors 15 and 16 respectively.

The semiconductor laser element 14 comprises a light emitting element utilizing a recombination radiation phenomenon of semiconductor. In the case of FIG. 5, it constitutes a horizontal resonator, and is used as a light emission source. A first light beam L1 emitted from the front surface of the semiconductor laser element 14 in a horizontal direction is guided to the first reflection mirror 15, and also a second light beam L2 emitted from the rear surface of the semiconductor laser element 14 in the horizontal direction is guided to the second reflection mirror 16.

Here, the first reflection mirror 15 is formed of a reflection film such as a metal film, a dielectric multilayer film or the like on a flat slant surface formed on the semiconductor substrate 13 so as to have a slope angle of 45 degrees by forming a reflection. With this formation, the first reflection mirror 15 serves to reflect the light beam L1 from the front surface of the semiconductor laser element 14 in the upward direction of the figure.

The laser beam L1 which is reflected upwardly (in a direction as indicated by an arrow A in FIG. 5) is passed through the objective lens 12 and focused onto the signal recording surface, and the laser beam L1 irradiated onto the signal recording surface of the optical disc 19 is reflected from the surface of the optical disc 19 as a return laser beam. The return laser beam L1 is passed through the objective lens 12 and then incident to the first photodetector 17 of the light emitting and receiving element 11.

Further, the second reflection mirror 16 is formed of a reflection film of a metal film, a dielectric multilayer film or the like on a slant surface having a radius of curvature on the semiconductor substrate 13 so as to have a slope angle of substantially 45 degrees and provide astigmatism when reflecting the light. With this arrangement, the second reflection mirror 16 serves to reflect the light beam L2 from the rear surface of the semiconductor laser element 14 upwardly and substantially vertical to the flat plane of the semiconductor substrate 13, that is, toward the center of the objective lens 12 in FIG. 5.

The laser beam L2 which is reflected upwardly is passed through the objective lens 12 and then focused onto the signal recording surface of the optical disc 19. The laser beam L2 projected onto the signal recording surface of the optical disc 19 is reflected from the surface of the optical disc 19, passed through the objective lens 12 and then incident to the second photodetector 18 of the light emitting and receiving element 11.

Here, the second reflection mirror 16 of the light emitting and receiving element 11 is manufactured as shown in FIG.

Figure 1:
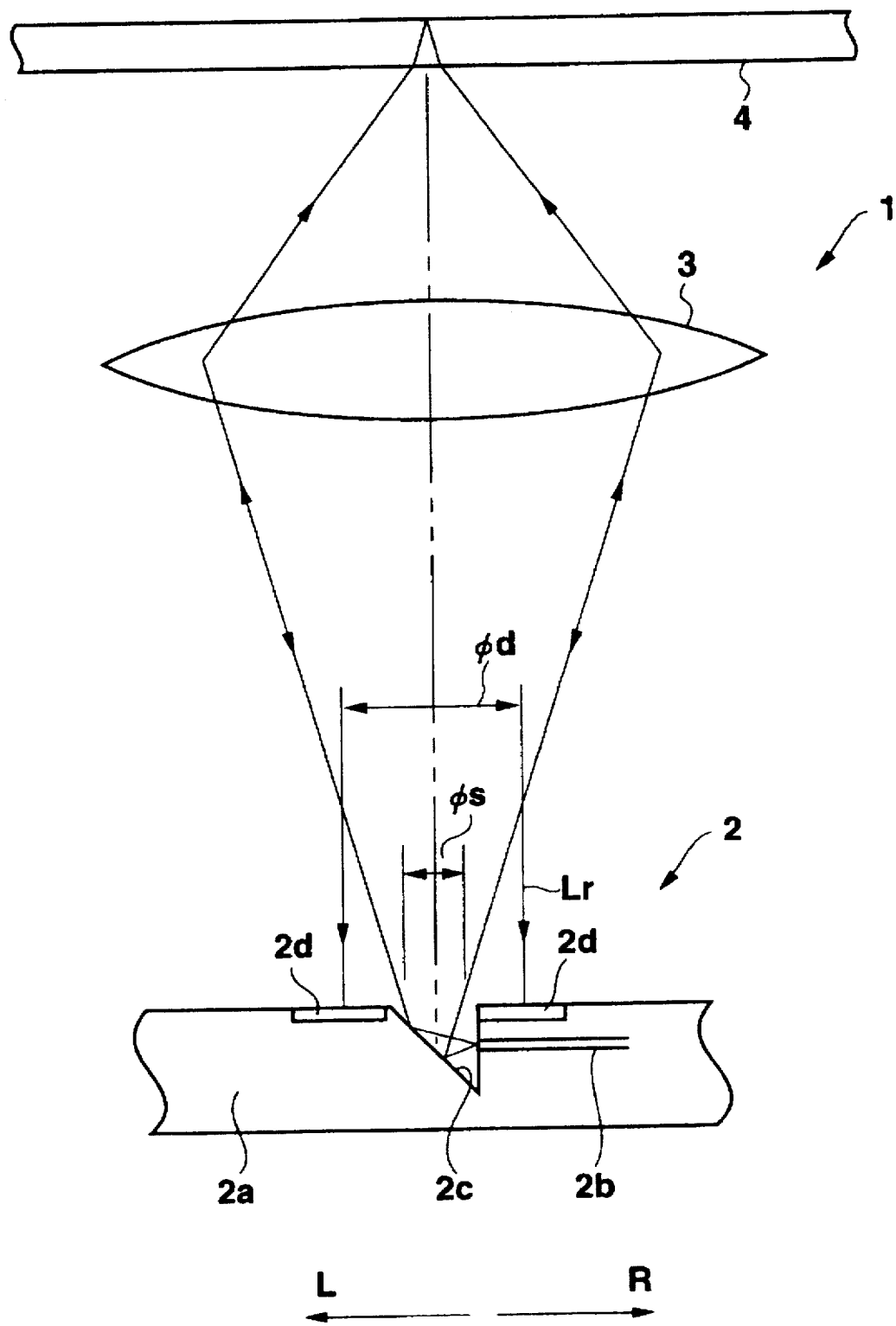
FIG. 1 is a schematic diagram showing a conventional optical pickup.
Figure 2:
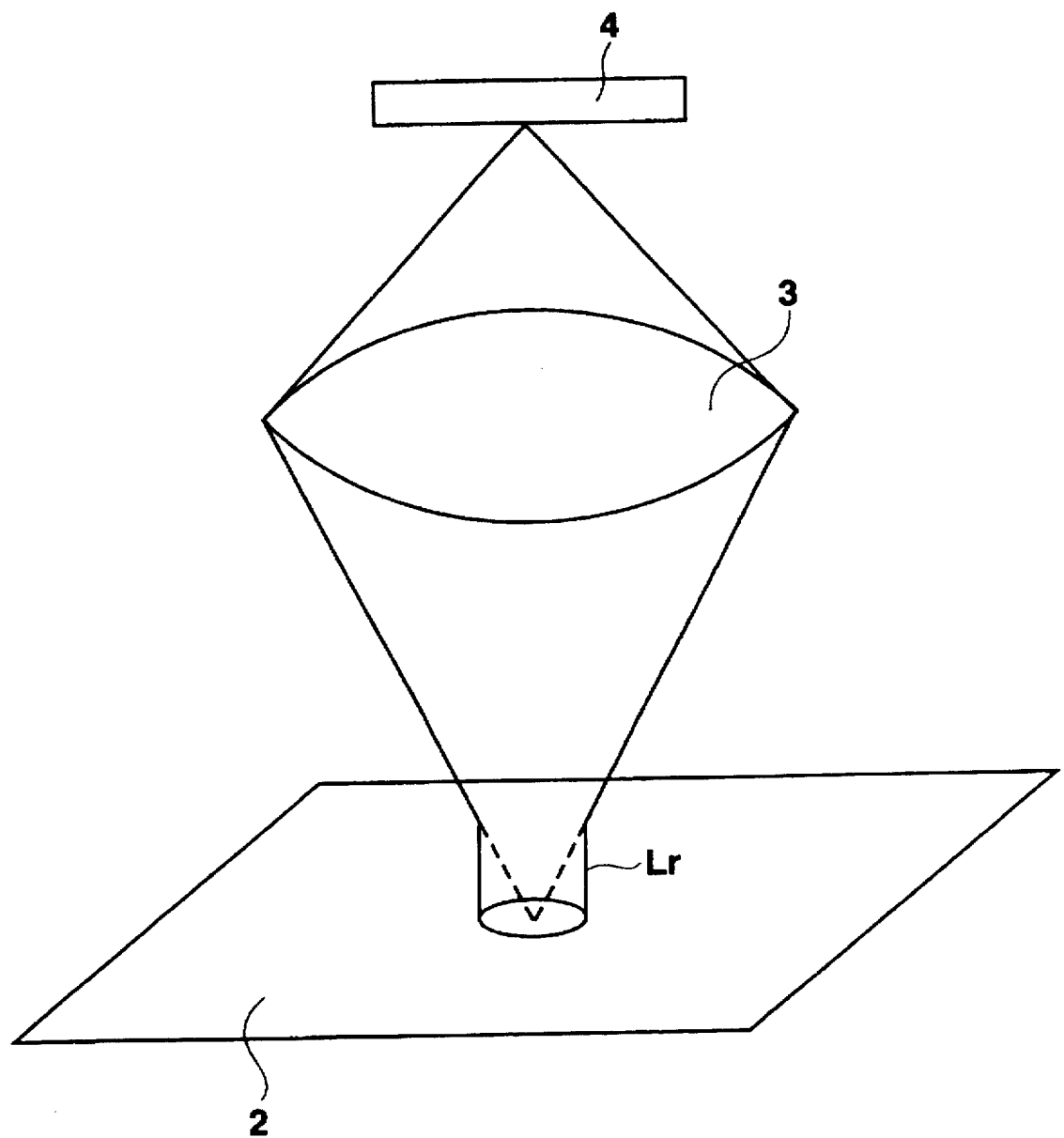
FIG. 2 is an enlarged perspective view showing the diffraction limit of an objective lens in the optical pickup shown in FIG. 1.
Figure 3:
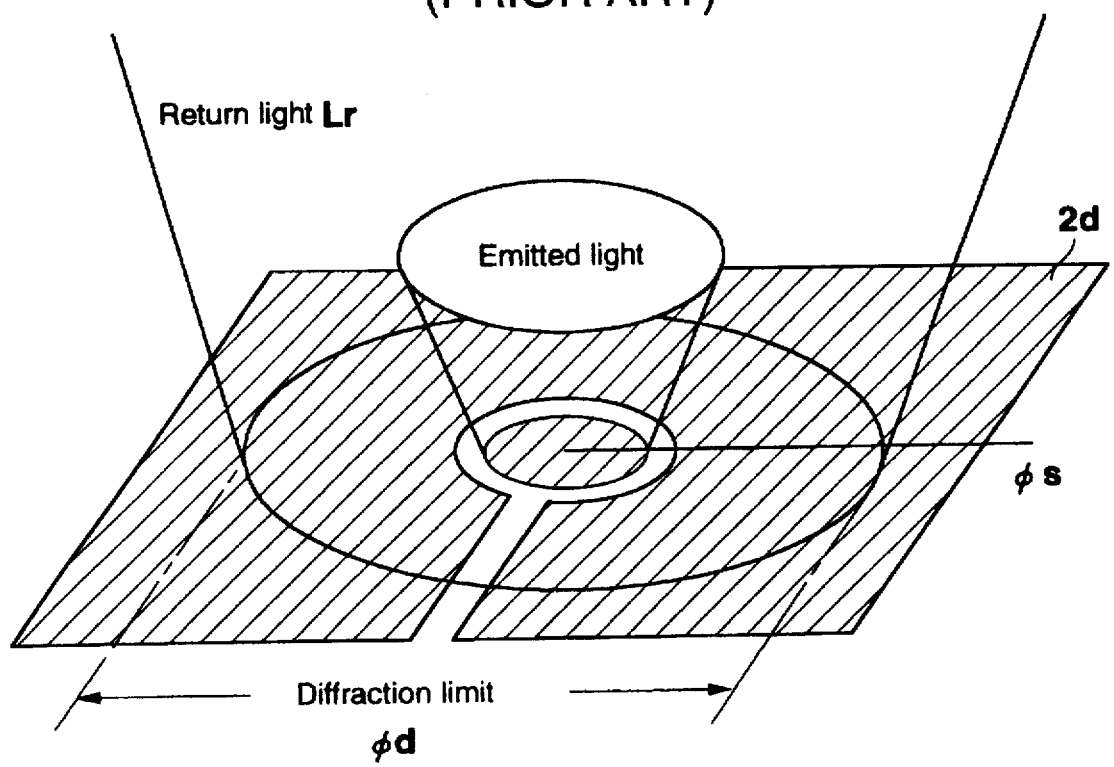
FIG. 3 is an enlarged perspective view showing the relationship between the diffraction limit of the objective lens shown in FIG. 2 and an emission light and a photodetector.
Figure 6:
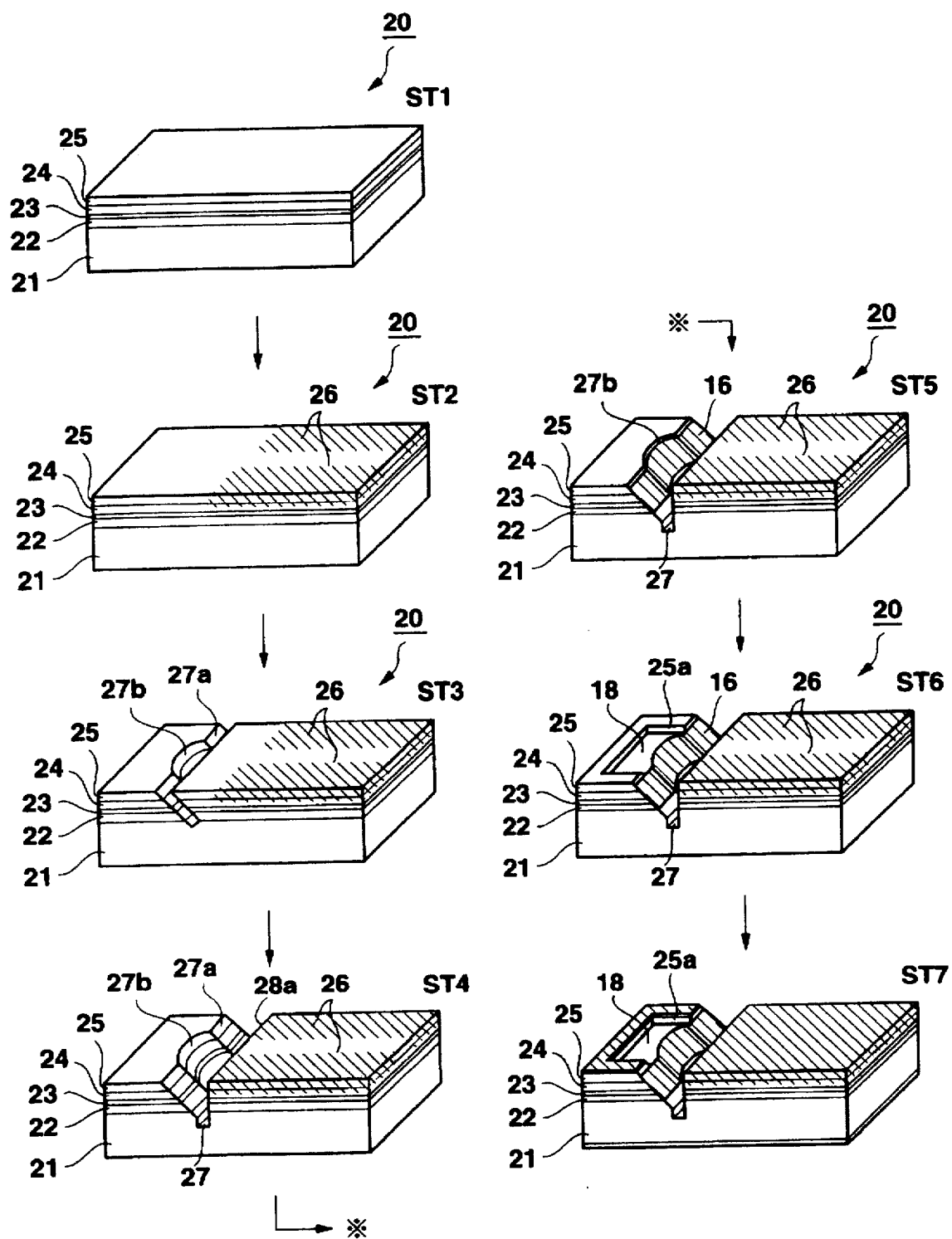
FIG. 6 is a process diagram showing a series of manufacturing process of a second reflection mirror of the light emitting and receiving element shown in FIG. 5.

6. In FIG. 6, the reflection mirror is illustrated at the opposite side to, that is, at the left side of the semiconductor laser element 14 because the perspective view of FIG. 3 is taken from the opposite side to those of FIGS. 4 and 5 with respect to the light emitting and receiving element 11.

In FIG. 6, in step ST1, a first conduction type, that is, n-type first clad layer 22 of AlGaAs or the like, an active layer 23 of AlGaAs or the like which has a lower Al concentration than GaAs or the clad layer 22, a second conduction type, that is, p-type second clad layer of AlGaAs, and a cap layer 25 of GaAs or the like which has the same conduction type as the second conduction type, are successively grown on a substrate 21 of a first conduction type, that is, n-type GaAs or InP compound semiconductor by an epitaxial growth method, thereby forming a semiconductor substrate 20.

In subsequent step ST2, a current preventing area 26 is formed from the cap layer 25 of the semiconductor substrate 20 so as to sandwich an area which will finally constitute a resonator of a semiconductor laser element by ion-implanting a first conduction type, for example, n-type impurities. Thereafter, in step ST3, a striped slant groove 27a is formed at a position adjacent to the current preventing area 26 of the semiconductor substrate 20 from the surface in an oblique direction substantially at an angle of 45 degrees so as to reach the substrate 21 by an anisotropic etching method such as RIE (Reactive Ion Etching) or the like. Here, the slant groove 27a is formed so as to have a curved surface 27b corresponding to the curved surface of the reflection mirror 16 as described above.

Furthermore, in step ST4, a vertical groove 27 having a stripe width of several μm is formed along the stripe direction of the groove 27a and in the neighborhood of the slant groove 27a by digging into the above layers vertically to the substrate surface by RIE or the like so that the digging top reaches the substrate 21. With this process, one resonator end face (rear surface) 28a of the semiconductor laser element 14 is constructed by the slant groove 27a and the inner side surface of the vertical groove 27 at the opposite side to the curved surface 27b.

Subsequently, in step ST5, a reflection film of a metal film, a dielectric multilayer film or the like is coated on the slant surface 27a of the semiconductor substrate 20 and the slant surface of the curved surface 27b at the opposite side to the vertical; groove 27 to form the reflection mirror 16. With this process, the semiconductor laser element 14 and the reflection mirror 16 which confronts rear surface of the semiconductor laser element 14 in this area.

In step ST6, an area of the cap layer 25 of the semiconductor substrate 20 which confronts the semiconductor laser element 14 is removed to form a window portion 25a, and a photodetector 18 comprising a photodiode PD having the window portion 25a as a light receiving face is constructed.

Finally, electrodes 29a and 29b are ohmically coated at these portions on the cap layer 25 which correspond to the semiconductor laser element 14 and the photodetector 18, and a common electrode 29c is formed on the lower surface of the substrate 21.

According to the above-described process, the reflection mirror 16, the semiconductor laser element 14 and the photodetector 18 are constructed in the area of the reflection mirror 16 of the light emitting and receiving element 11, and likewise the reflection mirror 15 and both the first photodetector 17 and the semiconductor laser element 14 at the reflection mirror 15 side can be formed at the same time as the reflection mirror 16 and the second photodetector 18.

The manufacturing process and the constituent materials are exemplified, and thus other manufacturing processes and constituent materials may be used.

According to the above-described process, both the semiconductor laser element 14 and the first reflection mirror 15, both the second reflection mirror 16 and the first photodetector 17, and the second photodetector 18 of the light emitting and receiving element 11 are formed on the common semiconductor substrate 21, so that the interval between the light emitting portion and the light receiving portion can be set to about several μm, and the positional relationship between these portions can be surely set.

Figure 7:
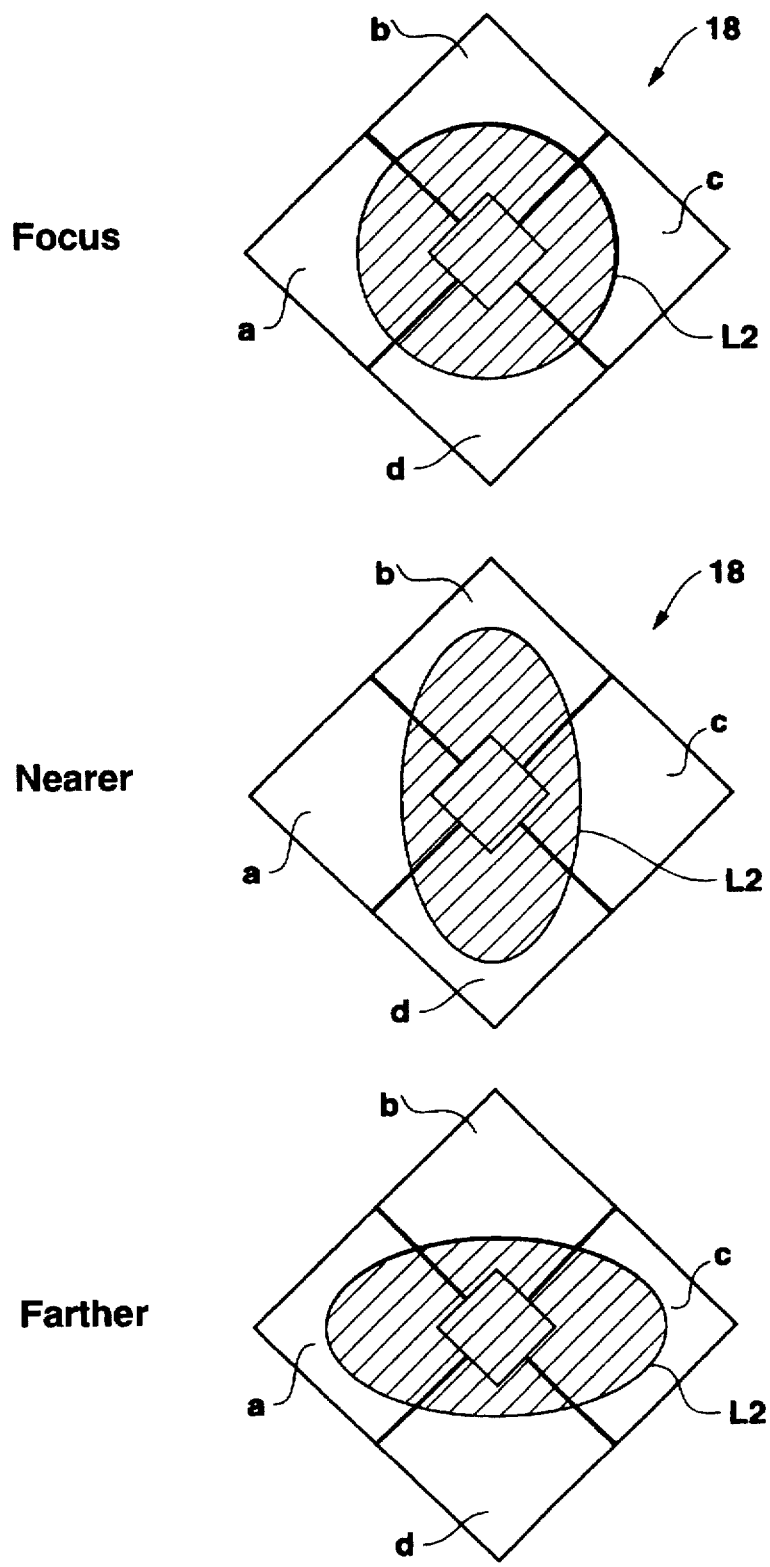
FIG. 7 is an enlarged plan view showing spot formation in the second photodetector in the optical pickup of FIG. 4.

The first photodetector 17 comprises two sensor portions into which the photodetector 17 is divided in the right and left direction in FIG. 4, and the second photodetector 18 is divided into four sensor portions a, b, c and d as shown in FIG. 7.

The detection signal from each sensor portion of the first photodetector 17 is amplified by a head amplifier in a processing circuit (not shown), and then output to a processing circuit (not shown). Furthermore, the detection signal from each of the sensor portions a, b, c, and d of the second photodetector 18 is amplified by a head amplifier in a processing circuit (not shown), and then output to a calculation circuit (not shown).

In the above process, on the basis of the detection signals from the respective sensor portions of the first photodetector 17, the reproduction signal is calculated from the sum signal of the detection signals and the tracking error signal is calculated from the differential signal of the detection signals by the calculation circuit. Further, on the basis of the detection signals from the respective sensor portions of the second photodetector 18, the focus error signal FCS is calculated by a calculation circuit (not shown) as follows:

$$FCS=(Sa+Sc)-(Sb+Sd)$$

Here, Sa, Sb, Sc, Sd represents the detection signals from the sensor portions of the second photodetector 18 respectively.

At least a part of the light receiving face of the first photodetector 17 is located so that the distance from the optical axis of the light beam traversing the arrangement reference face of the light receiving face is within 1.22 $\lambda/NA$, for example, where $\lambda$ represents the wavelength of the light beam from the semiconductor laser element and NA represents numerical aperture of the objective lens 12.

The optical pickup 10 according to this embodiment is constructed as described above, and the light beam L1 emitted from the front face of the semiconductor laser element 14 is reflected from the surface of the reflection mirror 15 on the semiconductor substrate 13, passed through the objective lens 12 and then focused on the signal recording surface of the optical disc 19.

The return light beam L1 reflected from the signal recording surface of the optical disc 19 is passed through the objective lens 12 again and then incident to the first photodetector 17. The reproduction signal and the tracking error signal are calculated on the basis of the output signals from the respective sensor portions of the first photodetector 17.

The light beam L2 emitted from the rear face of the semiconductor laser element 14 is reflected from the reflection mirror 16 on the semiconductor substrate 13 while provided with astigmatism, passed through the objective lens 12 and then focused on the signal recording surface of the optical disc 19.

The return light beam L2 reflected from the signal recording surface of the optical disc 19 is passed through the objective lens 12 again, and then incident to the second photodetector 18. The focus error signal is calculated on the basis of the output signals from the sensor portions a, b, c and d.

In this case, when the optical disc 19 is relatively located at the focus point, the spot of the return light L2 formed on the second photodetector 18 becomes circular as shown at the upper stage of FIG. 7, and thus the same quantity of light is incident to each of the sensor portions a, b, c and d. Further, the focus error signal FCS is equal to zero.

On the other hand, when the optical disc 19 is relatively located at a position near to the focus point, the spot of the return light L2 formed on the second photodetector 18 becomes elliptical as shown at the middle state of FIG. 7. When the optical disc 19 is relatively located at a position farther than the focus point, the spot becomes elliptical as shown at the lower stage of FIG. 7. Accordingly, the focus error signal FCS is negative for the former case and positive for the latter case. In this embodiment, the objective lens 12 is shifted in the focusing direction on the basis of the focus error signal FCS by an objective lens driving apparatus (not shown).

In this case, the irradiation position on the optical disc 19 of the light beam L2 from the rear face of the semiconductor laser element 14 is displaced from the irradiation position on the optical disc 19 of the light beam L1 from the front face of the semiconductor laser element 14. This displacement is equal to about 40 μm for an objective lens having a magnification of ⅕ when the distance between the reflection mirrors 15, 16 is equal to about 200 μm for example. Therefore, no problem occurs at the detection point of the focus.

Figure 8:
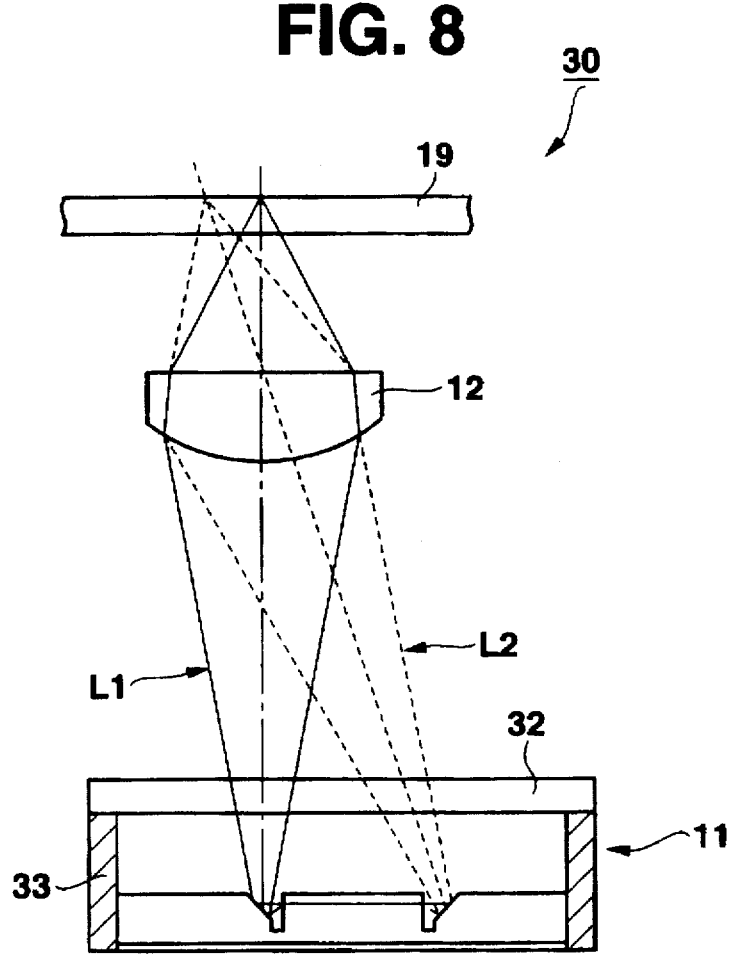
FIG. 8 is a schematic diagram showing the whole construction of a second embodiment of the optical pickup according to the present invention.
Figure 9:
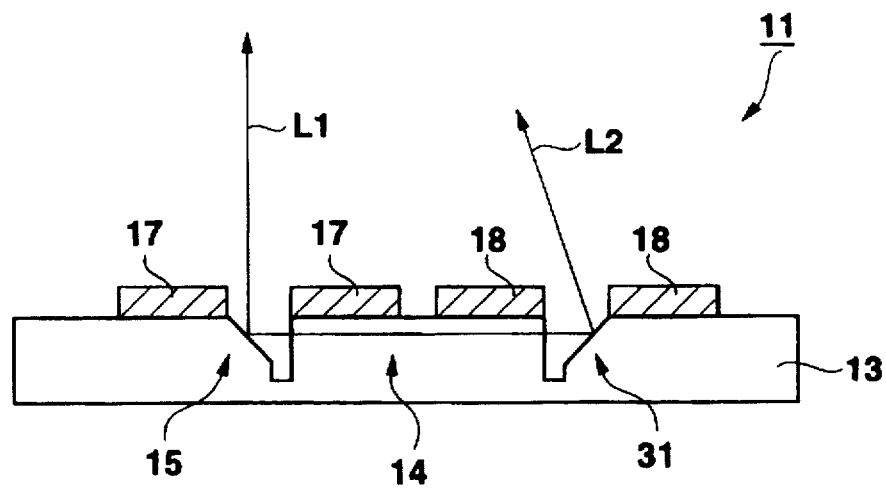
FIG. 9 is an enlarged view showing the light emitting and receiving element of the optical pickup of FIG. 8.

FIGS. 8 and 9 show a second embodiment of the optical pickup of the present invention.

In FIGS. 8 and 9, comparing with the optical pickup 10 shown in FIG. 4, the optical pickup 30 has the same construction in the light emitting and receiving element 11 and the objective lens 12, except that the second reflection mirror 31 confronting the rear face of the semiconductor laser element 14 is a plane mirror and a flat-plate shaped optical member with parallel surfaces (a window glass 32 in FIGS. 8 and 9) is provided at the upper side of the light emitting and receiving element 11.

The window glass 32 is disposed as a cover for the light emitting and receiving element 11 which is accommodated in the package 33 in the case of FIGS. 8 and 9, and it is disposed in parallel to the semiconductor substrate 13. With this arrangement, the window glass 32 is disposed to be oblique to the light beam L2 which is emitted from the rear face of the semiconductor laser element 14 and then reflected from the plane reflector 31, so that the it provides the light beam L2 with astigmatism.

According to the optical pickup 30 thus constructed, the light beam L1 emitted from the light emitting and receiving element 11 is focused through the objective lens 12 onto the signal recording surface of the optical disc 19. The return light L1 reflected from the optical disc 19 is passed through the objective lens 12 and then incident to the first photodetector 17 of the light emitting and receiving element 11.

On the other hand, the light beam L2 emitted from the light emitting and receiving element 11 is reflected from the flat reflection mirror 31, passed through the window glass 32 and the objective lens 12 and then focused onto the signal recording surface of the optical disc 19. The return light L2 reflected from the optical disc 19 is passed through the objective lens 12, and then incident to the second photodetector 18 of the light emitting and receiving element 11. In this case, the light beam L2 is provided with astigmatism when passing through the window glass 32, so that a spot which meets a focusing state is formed on the second photodetector 18 like the case of the optical pickup 10 shown in FIG. 4. With this process, the reproduction signal, the tracking error signal and the focus error signal FCS are detected on the basis of the detection signals from the photodetectors 17 and 18.

Figure 10:
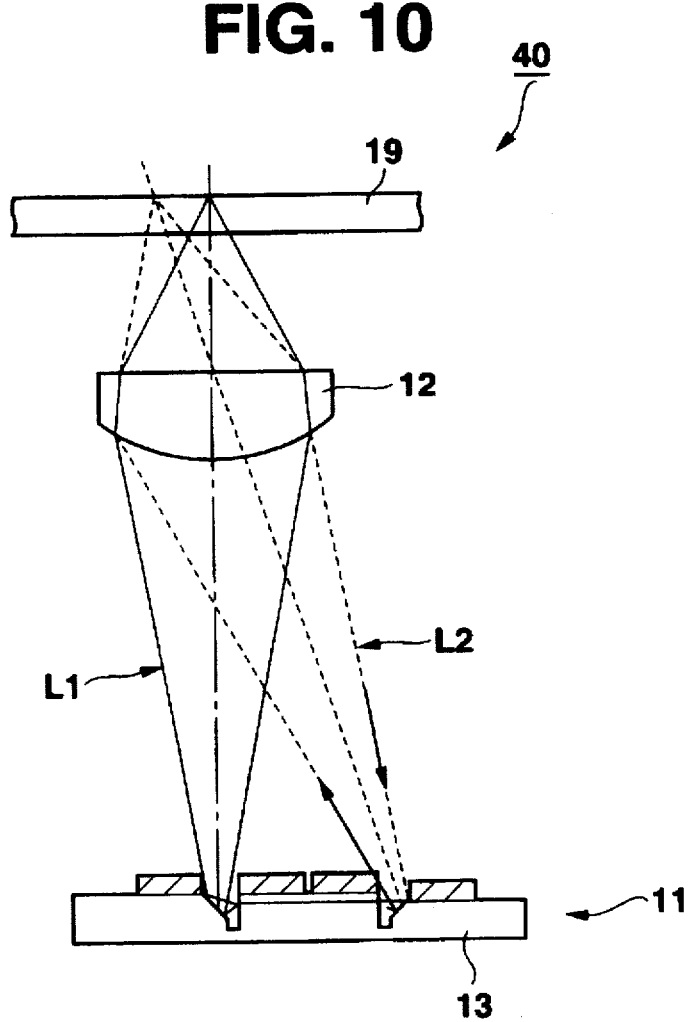
FIG. 10 is a schematic diagram showing the whole construction of a third embodiment of the optical pickup according to the present invention.
Figure 11:
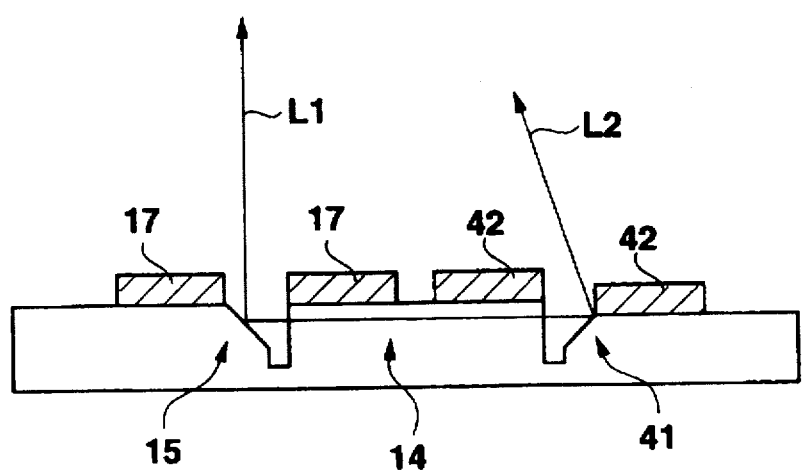
FIG. 11 is an enlarged view showing the light emitting and receiving element of the optical pickup of FIG. 10.

FIGS. 10 and 11 show a third embodiment of the optical pickup according to the present invention.

In FIGS. 10 and 11, comparing with the optical pickup 10 shown in FIG. 4, an optical pickup 40 of this embodiment has the same construction in the light emitting and receiving element 11 and the objective lens 12, except that a second reflection mirror 41 confronting the rear face of the semiconductor laser element 14 is a plane mirror and also is formed at only the lower side of the optical axis of the light beam L2 emitted from the rear face of the semiconductor laser element 14 in the case of FIGS. 10 and 11, and also except that a second photodetector 42 constructed as shown in FIG. 12 is disposed in place of the second photodetector 18 of the light emitting and receiving element 11.

As shown in FIG. 12, the second photodetector 42 comprises two sensor portions 42a and 42b which are divided in the right and left direction from the optical axis in FIG. 10.

According to the optical pickup 40 thus constructed, the light beam L1 emitted from the light emitting and receiving element 11 is passed through the objective lens 12, and then focused onto the signal recording surface of the optical disc 19. The return light L1 from the optical disc is passed through the objective lens 12, and then incident to the first photodetector 17 of the light emitting and receiving element 11.

On the other hand, the light beam L2 emitted from the light emitting and receiving element 11 is reflected from the reflection mirror 41, only the lower part with respect to the optical axis is reflected, passed through the objective lens 12 and then focused onto the signal recording face of the optical disc 19. The return light L2 reflected from the optical disc 19 is passed through the objective lens 12, and then incident to the second photodetector 18 of the light emitting and receiving element 11. In this case, the upper half of the light beam L2 with respect to the optical axis is cut out when reflected from the reflection mirror 41, so that a semicircular spot is formed on the second photodetector 42.

Accordingly, on the basis of the output signals from the respective sensor portions 42a and 42b of the second photodetector 42, the focus error signal FCS is calculated as follows:

FCS=SA−SB, where SA and SB represent the output signals of the sensor portions 42a and 42b of the second photodetector 42.

When the optical disc 19 is relatively located at the focus position, the spot of the return light L2 which is to be formed on the second photodetector 42 is substantially circular as shown at the top of FIG. 12, which is the diffraction limit of the objective lens 12. Therefore, the incident light quantity to each of the sensor portions 42a and 42b is equal, and thus the focus error signal FCS based on the differential signal is equal to zero.

On the other hand, when the optical disc 19 is relatively near than the focus position, the spot is a spot which exists at the right side (i.e., semicircular) as shown at the middle of FIG. 12. When the optical disc 19 is relatively farther than the focus position, the spot is a spot which exists at the left side (i.e., semicircular) as shown at the bottom of FIG. 12. Accordingly, the focus error signal FCS based on the differential signal is negative for the former case and positive for the latter case.

Accordingly, on the basis of the detection signal from the photodetector 17, the reproduction signal MO and the tracking error signal are detected, and on the basis of the detection signal from the photodetector 42, the focus error signal FCS is detected by so-called Foucault's method.

According to the embodiment as described above, the light beam emitted from the rear face of the semiconductor laser element of the light emitting portion of the light emitting and receiving element is reflected from the second reflection mirror, passed through the objective lens and then irradiated onto the signal recording face of the optical disc. The second return light beam reflected from the signal recording face of the optical disc recording medium is passed through the objective lens again, and then incident to the second photodetector of the light emitting and receiving element, whereby the focus error signal is detected on the basis of the output signal of the second photodetector.

Accordingly, the focus error signal is detected without using an external optical part, etc. Therefore, the apparatus can be designed in compact size, and the second reflection mirror can be manufactured in the same process as the first reflection mirror, so that the cost can be reduced and these elements can be accurately positioned. As a result, a light emitting and receiving element, an optical pickup and an optical disc device which has very high reliability can be provided.

In the third embodiment as described above, the reflection mirror 42 is constructed to reflect only the lower half port of the light beam L2, however, the present invention is not limited to this mode. For example, only the upper half part of the light beam L2 may be reflected from the reflection mirror 42 insofar as the focus error signal can be detected by the Foucault's method. Further, it is obvious that the half light at the right or left side of the light beam L2 may be reflected. In this case, the second photodetector 42 is divided in the corresponding direction.

Furthermore, any embodiment as described above relates to the light emitting and receiving element which is installed in the optical pickup, however, the present invention is not limited to this mode. That is, the present invention is applicable to a light emitting and receiving element alone, and an optical disc apparatus as well as the above use mode. Further, the light emitting and receiving element of the present invention may be applied to an optical pickup for magnetooptical detection in combination with a suitable polarization splitting element or another photodetector.

As described above, according to the present invention, there can be provided a compact-size integration type of light emitting and receiving element which can also detect a focus error signal, an optical pickup and an optical disc apparatus which use the light emitting and receiving element.

What is claimed is:

1. An optical pickup device comprising:
    an objective lens for focusing a light beam onto a recording medium;
    a semiconductor laser element which is formed on a semiconductor substrate and adapted to emit a laser beam, said semiconductor laser element having first and second light emitting faces;
    a first reflection portion of the semiconductor substrate provided so as to confront the first light emitting face of said semiconductor laser element, said first reflection portion of the semiconductor substrate reflecting the laser beam emitted from the first light emitting face of said semiconductor laser element toward said objective lens;
    a second reflection portion of the semiconductor substrate provided so as to confront the second light emitting face of said semiconductor laser element, said second reflection portion of the semiconductor substrate reflecting the laser beam emitted from the second light emitting face of the said semiconductor laser element toward said objective lens;
    a first photodetector formed on the semiconductor substrate for receiving a return reflection light of the laser beam which is reflected from said first reflection portion of the semiconductor substrate, passed through said objective lens and focused on the recording medium; and
    a second photodetector formed on the semiconductor substrate for receiving a return reflection light of the laser beam which is reflected from said second reflection portion of the semiconductor substrate, passed through said objective lens and focused on the recording medium.

2. The optical pickup device as claimed in claim 1, further comprising an optical element which generates astigmatism and is located in an optical path between the second light emitting face of said semiconductor laser element and said objective lens.

3. The optical device as claimed in claim 2, wherein said optical element comprises a flat-shaped transparent optical member with parallel surfaces which is disposed to be oblique to the optical axis of the laser beam emitted from the second light emitting face of the semiconductor laser element.

4. The optical pickup device as claimed in claim 1, wherein said second reflection portion of the semiconductor substrate has a curved surface to generate astigmatism.

5. The optical pickup device as claimed in claim 1, wherein said second reflection portion of the semiconductor substrate is constructed so as to reflect to said objective lens only a half part of the light beam emitted from the second light emitting face of said second laser element with respect to the optical axis.

6. The optical pickup device as claimed in claim 1, wherein each of said first and second reflection portion of the semiconductor substrates are-constructed by forming a reflection film on a slant surface provided on said semiconductor substrate.

7. The optical pickup device as claimed in claim 1, wherein said first and second photodetectors are integrally formed on said semiconductor substrate so as to receive, in the neighborhood of a co-focus point, the return light beams which are emitted from the first and second light emitting faces of said semiconductor laser element respectively and then reflected from the recording medium.

8. The optical pickup device as claimed in claim 7, wherein said second photodetector has a light receiving area which is divided into four parts.

9. The optical pickup device as claimed in claim 1, wherein an information signal on the recording medium is detected on the basis of a detection output of said first photodetector, and a focus error of said objective lens is detected on the basis of a detection output of said second photodetector.

10. A light emitting and receiving element for emitting a laser beam and receiving a laser beam reflected from an irradiation target comprising:
    a semiconductor laser element formed on a semiconductor substrate for emitting a laser beam, said semiconductor laser element having first and second light emitting faces;

a first reflection portion of the semiconductor substrate provided so as to confront the first light emitting face of said semiconductor laser element, said first reflection portion of the semiconductor substrate reflecting the laser beam emitted from the first light emitting face of said semiconductor laser element to an irradiation target;

a second reflection portion of the semiconductor substrate provided so as to confront the second light emitting face of said semiconductor laser element, said second reflection portion of the semiconductor substrate reflecting the laser beam emitted from the second light emitting face of said semiconductor laser element to the irradiation target;

a first photodetector for receiving a return reflection light of the laser beam which is reflected from said first reflection portion of the semiconductor substrate and projected to the irradiation target; and a second photodetector for receiving a return reflection light of the laser beam which is reflected from said second reflection portion of the semiconductor substrate and projected to the irradiation target.

11. The optical light emitting and receiving element as claimed in claim 10, further comprising an optical element which is adapted to generate astigmatism and located in an optical path between the second light emitting face of said semiconductor laser element and an objective lens.

12. The optical pickup device as claimed in claim 11, wherein said optical element comprises a flat-shaped transparent optical member with parallel surfaces which is disposed to be oblique to the optical axis of the laser beam emitted from the second light emitting face of the semiconductor laser element.

13. The optical pickup device as claimed in claim 10, wherein said second reflection portion of the semiconductor substrate has a curved surface to generate astigmatism.

14. The optical pickup device as claimed in claim 10, wherein said second reflection portion of the semiconductor substrate is constructed so as to reflect to an objective lens only a half part of the light beam emitted from the second light emitting face of said second laser element with respect to the optical axis.

15. The optical pickup device as claimed in claim 10, wherein said first and second reflection portion of the semiconductor substrates are integrally formed on said semiconductor substrate.

16. The optical pickup device as claimed in claim 15, wherein each of said first and second reflection portion of the semiconductor substrates are constructed by forming a reflection film on a slant surface provided on said semiconductor substrate.

17. The optical pickup device as claimed in claim 10, wherein said first and second photodetectors are integrally formed on said semiconductor substrate so as to receive, in the neighborhood of a co-focus point, the return light beams which are emitted from the first and second light emitting faces of said semiconductor laser element respectively and then reflected from the recording medium.

18. The optical pickup device as claimed in claim 17, wherein said second photodetector has a light receiving area which is divided into four parts.

19. The optical pickup device as claimed in claim 10, wherein an information signal on the recording medium is detected on the basis of a detection output of said first photodetector, and a focus error of an objective lens is detected on the basis of a detection output of said second photodetector.

* * * * *